United States Patent
Konishi

(10) Patent No.: US 8,904,467 B2
(45) Date of Patent: Dec. 2, 2014

(54) DEVICE AND METHOD TO RESTRICT OPERATIONS FROM A TELEVISION RECEIVER OR EXTERNAL TERMINAL

(75) Inventor: Kenji Konishi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 298 days.

(21) Appl. No.: 12/864,452

(22) PCT Filed: Jan. 19, 2009

(86) PCT No.: PCT/JP2009/050635
§ 371 (c)(1),
(2), (4) Date: Aug. 5, 2010

(87) PCT Pub. No.: WO2009/093538
PCT Pub. Date: Jul. 30, 2009

(65) Prior Publication Data
US 2010/0299696 A1 Nov. 25, 2010

(30) Foreign Application Priority Data
Jan. 25, 2008 (JP) .................. 2008-014553

(51) Int. Cl.
| | | |
|---|---|---|
| *H04N 7/173* | (2011.01) | |
| *H04N 21/485* | (2011.01) | |
| *H04N 21/63* | (2011.01) | |
| *H04N 21/4227* | (2011.01) | |
| *H04N 21/443* | (2011.01) | |

(52) U.S. Cl.
CPC ............. *H04N 21/485* (2013.01); *H04N 21/63* (2013.01); *H04N 21/4227* (2013.01); *H04N 21/443* (2013.01)
USPC ............. 725/131; 725/25; 725/114; 725/139; 725/151

(58) Field of Classification Search
CPC ............ H04N 21/25; H04N 21/25816; H04N 21/25825; H04N 21/25875; H04N 21/482; H04N 21/4828; H04N 21/436; H04N 21/4532; H04N 21/633; H04N 21/654; H04N 21/443; H04N 21/45
USPC ........... 725/25, 37, 38, 105, 27–29, 114, 131, 725/132, 138, 139, 140, 148, 151, 152
See application file for complete search history.

(56) References Cited

U.S. PATENT DOCUMENTS

| | | | |
|---|---|---|---|
| 6,097,441 | A | 8/2000 | Allport |
| 6,584,493 | B1 | 6/2003 | Butler |

(Continued)

FOREIGN PATENT DOCUMENTS

| | | |
|---|---|---|
| CN | 1309867 A | 8/2001 |
| CN | 2717117 Y | 8/2005 |

(Continued)

OTHER PUBLICATIONS

Windows XP Worldwide, http://www.microsoft.com/china/windowsxp/pro/using/howto/gethelp/remoteassist/viaim.mspx, Aug. 28, 2002.

(Continued)

*Primary Examiner* — Farzana Hossain
(74) *Attorney, Agent, or Firm* — Birch, Stewart, Kolasch & Birch, LLP

(57) ABSTRACT

To provide a television receiver, server, operation system for the television receiver, and operation program of the television receiver for enabling an operator to control the television receiver as intended without causing a conflict between user operation and operator operation without using a gateway, a television receiver 110 capable of being operated via a network has an operation instruction receiving section 112 that receives an operation instruction given via the network, an operation accepting section 111 that accepts operation that is directly given without via the network, a restriction determining section 113 that distinguishes between the operation based on the operation instruction received in the operation instruction receiving section 112 and the operation accepted in the operation accepting section 111 and that determines whether or not to restrict each operation, and a receiver-side control section 115 that executes control associated with the operation when the restriction determining section 113 determines not to restrict the operation.

8 Claims, 8 Drawing Sheets

| OPERATION | USER OPERATION ENABLED STATE | USER OPERATION DISABLED STATE |
|---|---|---|
| STATE ACQUISITION | ○ | ○ |
| SETTING | × | ○ |
| POWER SUPPLY ON/OFF | × | ○ |
| VOLUME | × | ○ |
| CHANNEL | × | ○ |

| OPERATION | USER OPERATION ENABLED STATE | USER OPERATION DISABLED STATE |
|---|---|---|
| MAIN-BODY POWER SUPPLY ON/OFF | ○ | ○ |
| MAIN-BODY VOLUME | ○ | ○ |
| MAIN-BODY CHANNEL | ○ | × |
| REMOTE-CONTROL POWER SUPPLY | ○ | ○ |
| REMOTE-CONTROL VOLUME | ○ | ○ |
| REMOTE-CONTROL CHANNEL | ○ | × |
| REMOTE-CONTROL Ch.1 | ○ | × |
| REMOTE-CONTROL Ch.2 | ○ | × |
| REMOTE-CONTROL Ch.3 | ○ | × |
| REMOTE-CONTROL Ch.4 | ○ | × |
| REMOTE-CONTROL Ch.5 | ○ | |

(56) References Cited

U.S. PATENT DOCUMENTS

| | | | |
|---|---|---|---|
| 7,237,029 | B2 | 6/2007 | Hino et al. |
| 7,913,278 | B2 | 3/2011 | Ellis et al. |
| 8,006,263 | B2 | 8/2011 | Ellis et al. |
| 8,046,801 | B2 | 10/2011 | Ellis et al. |
| 2002/0069276 | A1 | 6/2002 | Hino et al. |
| 2002/0129362 | A1* | 9/2002 | Chang et al. ............... 725/32 |
| 2004/0045031 | A1* | 3/2004 | Gautier ..................... 725/110 |
| 2005/0028208 | A1* | 2/2005 | Ellis et al. ................. 725/58 |
| 2005/0039214 | A1 | 2/2005 | Lorenz et al. |
| 2005/0174494 | A1 | 8/2005 | Takenaka |
| 2005/0251827 | A1 | 11/2005 | Ellis et al. |
| 2006/0031883 | A1 | 2/2006 | Ellis et al. |
| 2006/0271997 | A1* | 11/2006 | Jacoby et al. .............. 725/135 |
| 2006/0290680 | A1 | 12/2006 | Tanaka et al. |
| 2008/0010655 | A1 | 1/2008 | Ellis et al. |
| 2008/0034038 | A1 | 2/2008 | Ciudad et al. |
| 2008/0166105 | A1 | 7/2008 | Vanderhoff |
| 2008/0189737 | A1 | 8/2008 | Ellis et al. |
| 2008/0189742 | A1 | 8/2008 | Ellis et al. |
| 2008/0189743 | A1 | 8/2008 | Ellis et al. |
| 2009/0044226 | A1 | 2/2009 | Ellis et al. |
| 2010/0251303 | A1 | 9/2010 | Ellis et al. |
| 2010/0299696 | A1 | 11/2010 | Konishi |
| 2011/0239260 | A1* | 9/2011 | Konishi ..................... 725/109 |
| 2012/0036532 | A1 | 2/2012 | Ellis et al. |
| 2012/0036533 | A1 | 2/2012 | Ellis et al. |
| 2012/0060189 | A1 | 3/2012 | Ellis et al. |
| 2012/0066719 | A1 | 3/2012 | Ellis et al. |
| 2012/0079525 | A1 | 3/2012 | Ellis et al. |
| 2012/0266193 | A1 | 10/2012 | Ellis et al. |

FOREIGN PATENT DOCUMENTS

| | | | |
|---|---|---|---|
| CN | 1764103 | A | 4/2006 |
| CN | 1893529 | A | 1/2007 |
| EP | 2 239 938 | A1 | 10/2010 |
| FR | 2845229 | A1 | 4/2004 |
| JP | 2002-44765 | A | 2/2002 |
| JP | 2002-92206 | A | 3/2002 |
| JP | 2002-108184 | A | 4/2002 |
| JP | 2004-96591 | A | 3/2004 |
| JP | 2005-26856 | A | 1/2005 |
| JP | 2005-197951 | A | 7/2005 |
| JP | 2005-275670 | A | 10/2005 |
| JP | 2006-157370 | A | 6/2006 |
| JP | 2006-287639 | A | 10/2006 |
| WO | WO 2009/093538 | A1 | 7/2009 |

OTHER PUBLICATIONS

European Search Report issued in corresponding EP Application No. 09817823.9, dated Feb. 11, 2013.

International Search report for corresponding application No. PCT/JP2009/067056 dated Jan. 12, 2010.

U.S. Office Action for corresponding U.S. Appl. No. 13/121,622, dated Aug. 30, 2012.

U.S. Office Action for corresponding U.S. Appl. No. 13/121,622, dated Mar. 12, 2013.

European Search Report issued in corresponding EP Patent Application No. 09703145.4, dated Feb. 11, 2013.

U.S. Office Action for corresponding U.S. Appl. No. 13/121,622, dated Sep. 13, 2013.

U.S. Office Action for corresponding U.S. Appl. No. 13/121,622 dated Feb. 21, 2014.

Advisory Action issued in U.S. Appl. No. 13/121,622 on May 2, 2014.

Office Action issued on Sep. 18, 2014 for corresponding U.S. Appl. No. 13/121,622.

* cited by examiner

| OPERATION | USER OPERATION ENABLED STATE | USER OPERATION DISABLED STATE |
|---|---|---|
| STATE ACQUISITION | ○ | ○ |
| SETTING | × | ○ |
| POWER SUPPLY ON/OFF | × | ○ |
| VOLUME | × | ○ |
| CHANNEL | × | ○ |

FIG.3A

| OPERATION | USER OPERATION ENABLED STATE | USER OPERATION DISABLED STATE |
|---|---|---|
| MAIN-BODY POWER SUPPLY ON/OFF | ○ | ○ |
| MAIN-BODY VOLUME | ○ | ○ |
| MAIN-BODY CHANNEL | ○ | × |
| REMOTE-CONTROL POWER SUPPLY | ○ | ○ |
| REMOTE-CONTROL VOLUME | ○ | ○ |
| REMOTE-CONTROL CHANNEL | ○ | × |
| REMOTE-CONTROL Ch.1 | ○ | × |
| REMOTE-CONTROL Ch.2 | ○ | × |
| REMOTE-CONTROL Ch.3 | ○ | × |
| REMOTE-CONTROL Ch.4 | ○ | × |
| REMOTE-CONTROL Ch.5 | ○ | |

FIG.3B

DEVICE AND METHOD TO RESTRICT OPERATIONS FROM A TELEVISION RECEIVER OR EXTERNAL TERMINAL

TECHNICAL FIELD

The present invention relates to a television receiver, server, operation system for the television receiver and operation program of the television receiver enabling the television receiver to be operated by an external terminal via a network.

BACKGROUND ART

In recent years, digital TV broadcasting has started and has enabled high-resolution high-definition pictures and speeches to be looked and listened by a television receiver. Further, almost coincidentally, support for networks proceeds in the television receiver. Then, with the proceeding, the functions of the television receiver have increased. As a result, the operation and various setting methods become complicated in the television receiver, and inquiries have increased in the customer support center prepared by the manufacturer or the like.

Generally, an operator receiving an inquiry asks a user to operate the remote control, recognizes conditions of the television receiver of the user and a cause of the event, then encourages the user to operate the remote control again, and attempts to solve the problem.

However, since the operation method becomes complicated as described above, there are many cases that the user cannot operate as instructed by the operator, and as a result, problems arise that the user is forced to be unpleasant and that the trouble of the user cannot be solved immediately. Then, a method is proposed that the operator operates an electrical appliance of the user directly or indirectly by a terminal via a communication network such as the Internet using an apparatus connected to the communication network, and thereby attempts to solve the trouble (see Patent Document 1).

However, in this method, a conflict may occur between the remote operation and direct operation. When the remote operation performed by the operator via the network and the direct operation performed by the user is performed almost at the same time, it is difficult to predict what state the appliance becomes, and it is hard to support. When the conflict occurs in the operation, the user consulting to solve the trouble is further confused, putting the cart before the horse. In contrast thereto, techniques are proposed that a dedicated gateway apparatus is prepared separately, and that instructions also in the direct operation are conveyed to a target appliance once via the gateway to control the appliance (see Patent Document 2).

Patent Document 1: Japanese Unexamined Patent Publication No. 2002-92206
Patent Document 2: Japanese Unexamined Patent Publication No. 2002-44765

DISCLOSURE OF INVENTION

Problems to be Solved by the Invention

However, the techniques as described in Patent Document 2 require the need of installing the gateway purposely in order for users to receive support, and are not realistic. Further, even in the direct operation, being controlled via the gateway results in taking time to operate, and the user is uncomfortable.

The present invention was made in view of such circumstances, and it is an object to provide a television receiver, server, operation system for the television receiver, and operation program of the television receiver for enabling an operator to control the television receiver as intended without causing a conflict between user operation and operator operation without using a gateway.

Means for Solving the Problem (1) To attain the aforementioned object, a television receiver according to the invention is a television receiver capable of being operated via a network, and is characterized by having an operation instruction receiving section that receives an operation instruction given via the network, an operation accepting section that accepts operation that is directly given without via the network, a restriction determining section that distinguishes between the operation based on the operation instruction received in the operation instruction receiving section and the operation accepted in the operation accepting section and that determines whether or not to restrict each operation, and a receiver-side control section that executes control associated with the operation when the restriction determining section determines not to restrict the operation.

Thus, the television receiver of the invention distinguishes between the operation based on the operation instruction received from the outside and the directly accepted operation, and determines whether or not to restrict each operation. Accordingly, a conflict does not occur between remote operation from the outside by an operator and direct operation by a user, and the operator is capable of performing control as intended. As a result, the user is capable of solving trouble using the remote operation by support of the operator. Meanwhile, since it is not necessary to perform the operation via a gateway or the like, the direct operation by a user does not require time, and the user is capable of performing the direct operation in an instant.

(2) Further, the television receiver according to the invention is characterized by further having an entrustment state managing section that manages whether or not the operation is entrusted to the outside, where the entrustment state managing section causes the restriction determining section to determine whether or not to restrict the operation accepted in the operation accepting section when the operation is entrusted to the outside, while causing the restriction determining section not to restrict the operation accepted in the operation accepting section when the operation is not entrusted to the outside. Thus, by managing restriction on the direct operation from the user corresponding to the entrustment state, it is possible to simplify the processing of the direct operation when the operation is not entrusted.

(3) Furthermore, the television receiver according to the invention is characterized in that the restriction determining section determines whether or not to restrict each operation corresponding to substance of the operation. By this means, it is possible to enable the operation or restrict the operation corresponding to the operating substance of each operation, as well as the operation being via the network or not. Accordingly, while basically restricting the operation from the user, it is possible to enable only predetermined operation.

(4) Still furthermore, the television receiver according to the invention is characterized by further having a restriction control instruction receiving section that receives a restriction control instruction for providing instructions for control on whether or not to restrict each operation, where according to the received restriction control instruction, the restriction control instruction receiving section determines a criterion by which the restriction determining section determines whether or not to restrict each operation. Thus, the television receiver of the invention determines a criterion according to the received restriction control instruction. By this means, it is possible to impose or remove a restriction on each operation by varying the criterion via the network.

(5) Moreover, the television receiver according to the invention is characterized by further having a restriction storing section that stores a restriction determination table for associating the operation based on the received operation instruction or the accepted operation with a restriction on the operation, where the restriction determining section determines whether or not to restrict each operation based on the stored restriction determination table. Thus, the television receiver of the invention determines whether or not to restrict each operation based on the stored restriction determination table. By this means, it is possible to make an efficient determination, and management of the criterion is also made ease.

(6) Further, the television receiver according to the invention is characterized by further having a receiver-side display section that displays substance of operation restriction based on the criterion by which the restriction determining section determines whether or not to restrict each operation. By this means, since the user is capable of knowing the restriction on operation, the operator is capable of performing support smoothly. Further, the user is capable of knowing a current state of the television receiver, and of receiving the support at ease.

(7) Moreover, a server according to the invention is a server for enabling operation of a television receiver from an external terminal via a network, and is characterized by having a connection establishing section that establishes a connection between the external terminal and the television receiver when receiving entrustment information for entrusting operation to the external terminal transmitted from the television receiver, and an instruction processing section which receives an operation instruction transmitted from the external terminal to operate the television receiver, and transmits the operation instruction to the television receiver having the connection established to the external terminal.

By this means, when the server receives the entrustment information transmitted from the television receiver, the server establishes a connection between the television receiver and the external terminal, and it is thereby possible to convey the operation instruction to the television receiving having the established connection. As a result, direct operation by the user is restricted after the user confirms that the operation is restricted, and the user is thereby capable of receiving support of the operator at ease.

(8) Further, an operation system for a television receiver according to the invention is an operation system for a television receiver comprised of an apparatus group of a television receiver, a server, and an external terminal connected via a network, and is characterized in that the server has an instruction processing section which receives an operation instruction transmitted from the external terminal to operate the television receiver, and transmits the operation instruction to the television receiver having a connection established to the external terminal, and that the television receiver has an operation instruct ion receiving section that receives an operation instruction given via the network, an operation accepting section that accepts operation that is directly given without via the network, a restriction determining section that distinguishes between the operation based on the received operation instruction and the accepted operation and that determines whether or not to restrict each operation, and a receiver-side control section that executes control associated with the operation when the restriction determining section determines not to restrict the operation.

Thus, the operation system for a television receiver of the invention distinguishes between the operation based on the operation instruction received from the external terminal and the directly accepted operation, and the television receiver determines whether or not to restrict each operation. Accordingly, a conflict does not occur between the operation performed from the outside via the network and the operation that is directly performed on the television receiver, and the operator is capable of performing control as intended. As a result, the user is capable of solving trouble using remote operation by support of the operator.

(9) Further, an operation program of a television receiver according to the invention is an operation program of a television receiver executed by the television receiver capable of being operated via a network, and is characterized by including operation instruction receiving processing of receiving an operation instruction given via the network, operation accepting processing of accepting operation that is directly given without via the network, restriction determining processing of distinguishing between the operation based on the received operation instruction and the accepted operation to determine whether or not to restrict each operation, and operation executing processing of executing control associated with the operation when it is determined not to restrict the operation in the restriction determining processing.

Thus, the operation program of a television receiver of the invention distinguishes between the operation based on the operation instruction received from the outside and the directly accepted operation, and determines whether or not to restrict each operation. Accordingly, a conflict does not occur between the operation performed from the outside via the network and the operation that is directly performed on the television receiver, and the operator is capable of performing control as intended. As a result, it is possible to solve trouble using remote operation by support of the operator.

Advantageous Effect of the Invention

According to the invention, a conflict does not occur between remote operation from the outside by an operator and direct operation by a user, and the operator is capable of performing control as intended. As a result, the user is capable of solving trouble using remote operation by support of the operator. Meanwhile, since it is not necessary to perform the operation via a gateway or the like, the direct operation by a user does not require time, and the user is capable of performing the direct operation in an instant.

BRIEF DESCRIPTION OF DRAWINGS

FIG. 3A is a conceptual diagram illustrating a restriction determination table for associating remote operation with a restriction on the operation;

FIG. 3B is a conceptual diagram illustrating a restriction determination table for associating direct operation with a restriction on the operation;

Figure 1:
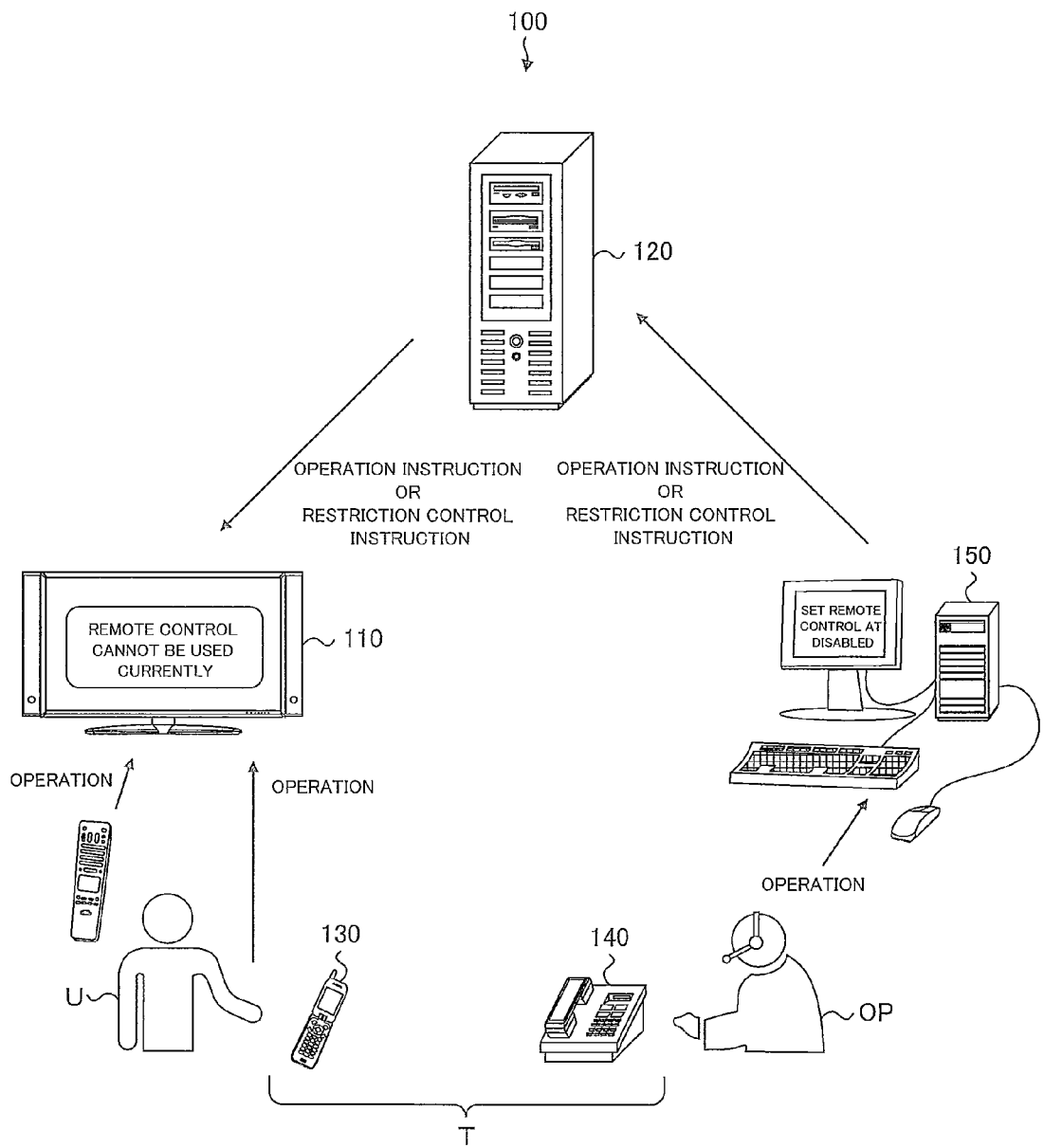
FIG. 1 is a conceptual diagram illustrating a configuration of an operation system for a television receiver according to Embodiment 1 of the invention.

DESCRIPTION OF SYMBOLS 100, 200 Operation system for a television receiver
110 Television receiver
111 Operation accepting section
112 Operation instruction receiving section
113 Restriction determining section
114 Restriction storing section
115 Receiver-side control section
116 Receiver-side entrustment information transmitting section
117 Restriction control instruction receiving section
118 Entrustment state managing section
119 Receiver-side display section
120 Server
121 Connection establishing section
122 Temporary connection information storing section
123 Real connection information storing section
124 Instruction processing section
126 Server-side control section
130, 140 Telephone
150, 250 External terminal
151 Operation section
152 External terminal-side display section
154 External terminal-side transmitting/receiving section
155 External terminal-side control section
256 External terminal-side entrustment information transmitting section
OP Operator
T Transfer means
U User

BEST MODE FOR CARRYING OUT THE INVENTION

Embodiments of the invention will be described below with reference to drawings. To facilitate understanding of the descriptions, the same structural element in each drawing is assigned the same reference numeral to omit descriptions thereof.

Embodiment 1

Configuration of an Operation System

FIG. 1 is a conceptual diagram illustrating a configuration of an operation system 100 for a television receiver. The operation system 100 for a television receiver is comprised of a television receiver 110, and server 120. The television receiver 110, server 120 and external terminal 150 are capable of being connected via a network. The arrows shown in FIG. 1 indicate transfer of primary information of the invention. In addition, also in drawings as described below, with respect to the transfer of information, primary information is only shown with the other information omitted.

The television receiver 110 is capable of being connected to the server 120 via the network, and of being operated via the network. The television receiver 110 is provided with a tuner, and receives radio signals for televisions to enable viewing of television programs, while being connected to the network to also function as a terminal. The network is a general network, and either a cable or wireless network. For example, the operation system 100 for the television receiver is used in the case where a user U cannot set the television receiver 110 in starting its use and therefore, contacts an operator OP using a telephone 130. The operator OP is capable of receiving contact using a telephone 140, and the telephones 130 and 140 constitute transfer means T.

(Configuration of Each Section)

Figure 2:
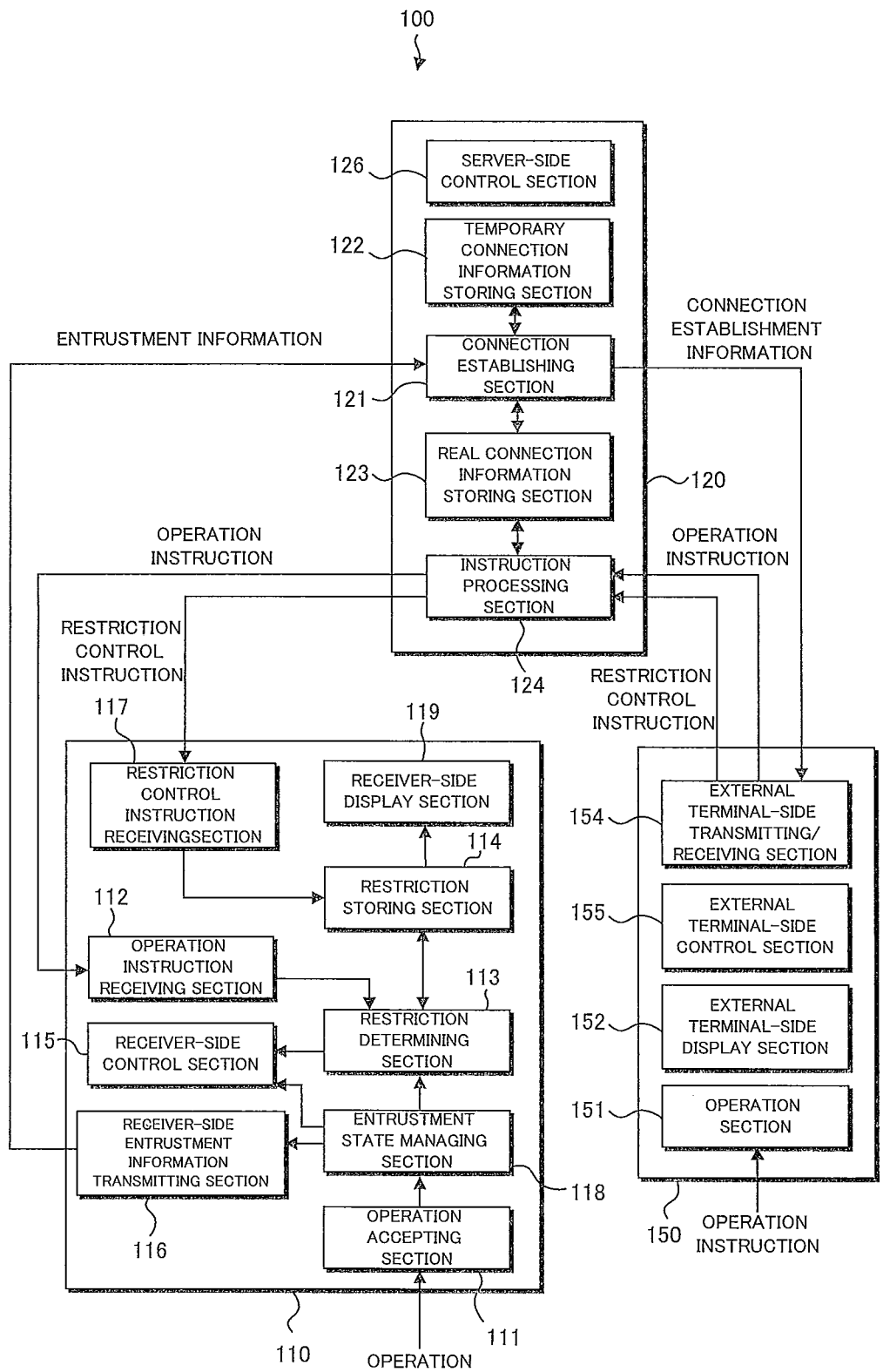
FIG. 2 is a block diagram illustrating a configuration of each section of the operation system for the television receiver according to Embodiment 1.

FIG. 2 is a block diagram illustrating a configuration of each section of the operation system 100 for the television receiver. The television receiver 110 is provided with an operation accepting section 111, operation instruction receiving section 112, restriction determining section 113, restriction storing section 114, receiver-side control section 115, receiver-side entrustment information transmitting section 116, restriction control instruction receiving section 117, entrustment state managing section 118, and receiver-side display section 119.

The operation accepting section 111 accepts operation (direct operation) given directly from the user without via the network. As the operation accepting section 111, there are operating buttons of the main body of the television receiver 110 and the remote control. The operation accepting section 111 accepts operation for entrusting operation to the operator, as well as operation for channel selection, internet setting, etc. The operation instruction receiving section 112 receives an operation instruction (remote operation) given via the network, and outputs the operation instruction to the restriction determining section 113.

The restriction determining section 113 distinguishes between the operation based on the received operation instruction and the accepted operation, and determines whether or not to restrict each operation. Further, the restriction determining section 113 determines whether or not to restrict each operation corresponding to substance of the operation based on a restriction determination table stored in the restriction storing section 114. For example, with respect to the operation based on the operation instruction received from the external terminal 150, the section 113 makes a determination whether or not to restrict the operation for acquiring information indicating a state of the television receiver 110, and the operation for changing settings. Further, with respect to the direct operation by the user, the section 113 determines whether or not to restrict each of the operation for turning on or off the power supply, the operation for turning the volume up or down, and the operation for selecting a channel. Thus, the restriction determining section 113 serves as a filter for the operation.

The restriction storing section 114 stores the restriction determination table for associating the operation (remote operation) based on the operation instruction received via the network or the directly accepted operation (direct operation) with a restriction on the operation. FIGS. 3A and 3B are conceptual diagrams respectively illustrating a restriction determination table for associating remote operation with a restriction on the operation, and another conceptual diagram illustrating a restriction determination table for associating direct operation with a restriction on the operation. ○ represents not undergoing restriction, while X represents undergoing restriction.

As shown in FIGS. 3A and 3B, in a user operation enabled state, the remote operation for acquiring information of a state of the television receiver 110 is not restricted, but the remote operation for changing settings, turning on or off the power supply, etc. is restricted. The remote operation for acquiring the information of a state is, for example, operation for checking a current set value, or the like. Any of direct operation is not restricted. In this way, in the user operation enabled state, by restricting the setting change and operation by the operator OP, a conflict of the operation is avoided. Meanwhile, in a user operation disabled state in which the television receiver 110 is set in receiving support, the remote operation is not restricted, but part of direct operation is restricted such as the operation of designating or changing a channel. The direct operation that is not restricted includes the operation associated with a power supply for turning off the power supply when the user U becomes anxious and the operation associated with the volume so as not to inhibit the conversation by telephone. In addition, the operation on the buttons installed in the main body of the television receiver 110 that is the operation accepting section 111 on the main body side may be distinguished from the operation on the remote control to provide the restriction with a difference.

The receiver-side control section 115 performs control on each section of the television receiver 110. When the restriction determining section 113 determines not to restrict the operation, the receiver-side control section 115 executes control associated with the operation. The receiver-side entrustment information transmitting section 116 transmits entrustment information managed in the entrustment state managing section 118 to the server 120.

The restriction control instruction receiving section 117 receives a restriction control instruction for providing instructions on whether or not to restrict each operation. Further, according to the received restriction control instruction, the restriction control instruction receiving section 117 determines a criterion by which the restriction determining section 113 determines whether or not to restrict each operation. When the restriction control instruction receiving section 117 receives a restriction control instruction for instructing the section 117 to change the state, the section 117 changes the state of operation restriction on the television receiver 110 stored in the restriction storing section 114. Further, when the restriction control instruction receiving section 117 receives a restriction control instruction for instructing the section 117 to change the table, the section 117 changes the restriction determination table stored in the restriction storing section 114 according to the instruction. The restriction storing section 114 stores the state of the television receiver 110. As the state, for example, there are a user operation disabled state and user operation enabled state.

The entrustment state managing section 118 manages whether or not the user U entrusts the operation to the outside. When the operation accepting section 111 accepts the operation for entrusting the operation to the operator from the user, the entrustment state managing section 118 shifts to a state where the operation of the television receiver 110 is entrusted to the outside. When the connection between the television receiver 110 and external terminal 150 is disconnected, the entrustment state managing section 118 shifts to a state where the operation is not entrusted to the outside. When the operation is not entrusted to the outside, the entrustment state managing section 118 informs the receiver-side control section 115 of the substance of the operation received in the operation accepting section 111. Accordingly, in this case, the restriction determining section 113 does not restrict the operation accepted in the operation accepting section 111.

Meanwhile, when the operation is entrusted to the outside, the entrustment state managing section 118 informs the restriction determining section 113 of the substance of the operation accepted in the operation accepting section 111. Then, when the operation is entrusted to the outside, it is determined whether or not to restrict the operation accepted in the operation accepting section.

The receiver-side display section 119 displays the substance of operation restriction based on the criterion by which the restriction determining section 113 determines whether or not to restrict each operation. The receiver-side display section 119 is only required to display the substance according to the information stored in the restriction storing section 114. For example, the section 119 may display whether or not the television receiver 110 is in the user operation disable state, or display the operation restricted as a result. Further, display may be made using an icon, etc. as well as text to facilitate understanding of the content of display through intuition.

Figure 4A:
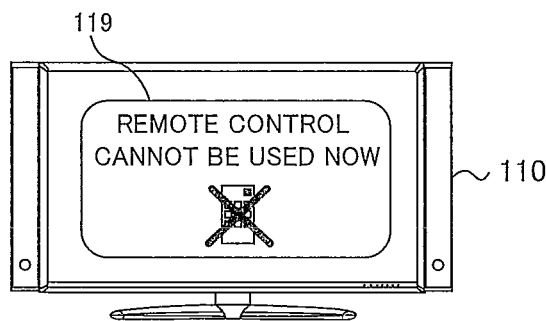
FIGS. 4A and 4B are diagrams showing display examples of the television receiver.
Figure 4B:
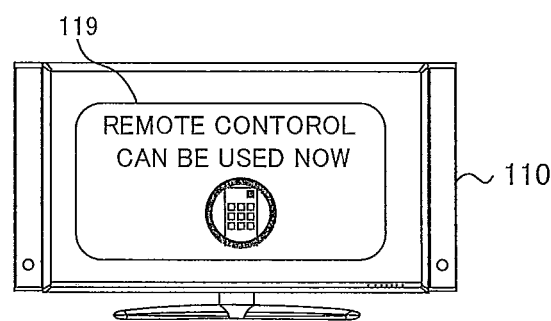

FIGS. 4A and 4B are diagrams showing display examples of the television receiver 110. As shown in FIG. 4A, when the state is changed to the user operation disabled state, the receiver-side display section 119 displays that "the remote control cannot be used now" to inform the user of the status of the restriction on operation. Further, as shown in FIG. 4B, when the state is restored to the user operation enabled state, the receiver-side display section 119 displays that "the remote control can be used now" to inform the user that the restriction on operation is removed. In this way, the television receiver 110 is configured which enables the operation to be restricted.

The server 120 is provided with a connection establishing section 121, temporary connection information storing section 122, real connection information storing section 123, instruction processing section 124 and server-side control section 126. The connection establishing section 121 establishes a connection between the external terminal and television receiver when the section 121 receives the entrustment information for entrusting the operation to the external terminal 150 transmitted from the television receiver 110. The connection is established by registering identification information of a paired terminal with which a temporary connection is connected as a connection established pair.

The temporary connection information storing section 122 associates the television receiver 110 and external terminal 150 with each other to register with a temporary connection pair table, when the temporary connection is established between the television receiver 110 and external terminal 150. For example, the user U informs the operator OP of key information associated with the identification information of the television receiver 110 by the transfer means T, the server 120 verifies the key information transmitted from the external terminal 150, and the temporary connection is thereby established. The real connection information storing section 123 stores a connected pair table for associating a pair connected with each other. In other words, when the connection is established between the television receiver 110 and external terminal 150, the identification information of the receiver 110 and terminal 150 is stored in the connected pair table.

The instruction processing section 124 receives an operation instruction or restriction control instruction that is transmitted from the external terminal 150 to operate the television receiver 110, and transmits each instruction to the television receiver 110 establishing the connection with the external terminal 150. The server-side control section 126 performs control on each section of the server.

The external terminal 150 is a terminal operated by the operator OP. The external terminal 150 is a personal computer (PC) or the like, and is capable of gaining access to the server 120 via the network. The external terminal 150 is provided with an operation section 151, external terminal-side display section 152, external terminal-side transmitting/receiving section 154, and external terminal-side control section 155.

For example, the operation section 151 is an input apparatus such as a keyboard and mouse, and accepts operation of the operator OP. The operation section 151 receives an input of the operator OP. The external terminal-side display section 152 corresponds to a display screen, for example, and displays information of establishment of the connection, information of the state of operation restriction on the television receiver 110, etc. The external terminal-side transmitting/receiving section 154 is an interface to the network, transmits and receives information to/from the outside, and is also used when the external terminal 150 accesses the television receiver 110. The external terminal-side control section 155 performs control on each section of the external terminal 150.

(Action in the Operation System)

Figure 5:
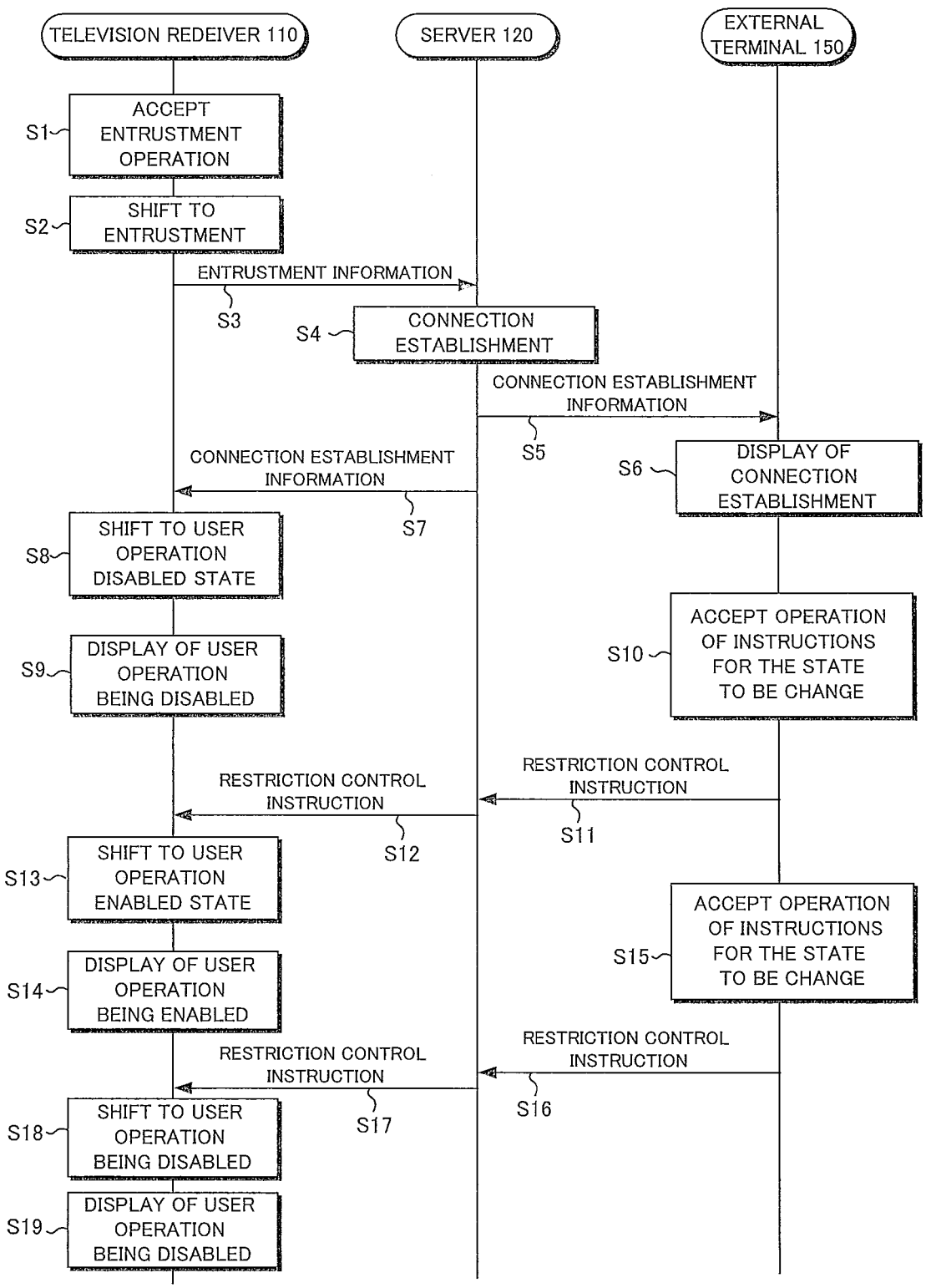
FIG. 5 is a sequence chart showing an example of action in the operation system for the television receiver according to Embodiment 1.

Described next is the action in thus configured operation system for the television receiver. FIG. 5 is a sequence chart showing an example of the action in the operation system 100 for the television receiver. For example, the following situation is assumed as a premise. The user U purchased the television receiver 110, established a connection to the Internet, but since the setting does not proceed successfully, makes a telephone call to the operator OP. The operator OP encourages the user U to undergo network remote diagnosis of the television receiver 110, and guides the method up to the temporary connection. When the television receiver 110 of the user U and the external terminal 150 of the operator OP are connected by a generally considered method such as advance registration and log in, the server 120 stores the identification information for specifying the paired partners in the temporary connection pair table of the temporary connection information storing section 122. When the temporary connection is established, the operator OP requests the user U to entrust the operation of the television receiver 110 by display on the screen of the television receiver 110 or conservation. Herein, the user U receives an explanation that a restriction is imposed on the operation of the user U such that part of the remote control or all of the buttons will be not enabled. The explanation may be given by asking the user U "do you entrust the operation of the TV to the operator OP? Yes/NO", or obtaining permission collectively including in use permission that is informed to the user U before the temporary connection or real connection.

First, the user U who understands the restriction to be imposed and still desires the apparatus diagnosis performs the entrustment operation on the television receiver 110, and the television receiver 110 accepts the operation (step S1). The television receiver 110 accepting the entrustment operation changes the operation to the state "during entrustment" i.e. the state where the operation is entrusted to the outside in the entrustment state managing section 118 (step S2), and transmits the entrustment information to the server 120 (step S3). The entrustment information is information indicating that the user U entrusts the operation to the operator OP.

The server 120 receives the entrustment information and establishes the real connection (step S4). Then, the server 120 transmits connection establishment information to the external terminal 150 (step S5). The connection establishment information is information indicating that the real connection is established. The external terminal 150 receives entrustment confirmation information transmitted from the server 120, and displays the fact that entrustment is made and that the connection is established in the external terminal-side display section 152 (step S6). When this state is made, the server 120 delivers the instruction from the external terminal 150 to the television receiver 110 with which the connection is established. By this means, the operator OP performs operation of the television receiver 110 of the assigned user.

Meanwhile, the server 120 transmits the connection establishment information also to the television receiver 110 (step S7). When the television receiver 110 receives the connection establishment information, the television receiver 110 shifts to the user operation disabled state (step S8). More specifically, as shown in FIGS. 3A and 3B, the television receiver 110 changes the restriction criterion to enable the television receiver 110 to be set by remote operation, and restricts the operation from the main body and remote control except on/off of the power supply and up/down of the volume. Then, the television receiver 110 displays the shift to the user operation disabled state in the receiver-side display section 119 (step S9). By this means, the operator OP is capable of remotely operating the television receiver 110 from the external terminal 150 and making settings and the like corresponding to the substance of consultation from the user.

When predetermined settings are made by the operation of the operator OP, the need arises to check whether the settings are made as the user U desires. In this case, the operator OP calls the user U to inform of the need, and performs the operation for shifting the television receiver 110 to the user operation enabled state. The external terminal 150 accepts the operation by the operator OP (step S10). Then, the external terminal 150 transmits a restriction control instruction for instructing the television receiver 110 to change the state (step S11), and the server 120 receiving the instruction transmits the restriction control instruction to the television receiver 110 (step S12).

The television receiver 110 receiving the restriction control instruction shifts to the user operation enabled state (step S13). The television receiver 110 thus shifts to the user operation enabled state, and thereby accepts the operation for designating a channel or the like from the user. Then, the television receiver 110 displays the shift to the user operation enabled state (step S14). By the television receiver 110 shifting to such a state, the user is capable of checking whether a response to the operation by the user U is as the user desires and whether desired setting are made. In the user operation enabled state, the operation for making settings of the television receiver 110 is restricted among the remote operation by the operator OP.

Subsequently, when the need further arises to remotely operate the television receiver 110, the operator OP performs the operation for shifting to the user operation disabled state. The external terminal 150 accepts the operation by the operator OP (step S15). Then, the external terminal 150 transmits a restriction control instruction for instructing the television receiver 110 to change the state (step S16), and the server 120 receiving the instruction transmits the restriction control instruction to the television receiver 110 (step S17).

The television receiver 110 receiving the restriction control instruction shifts to the user operation disabled state (step S18). The television receiver 110 thus shifts to the user operation disabled state, and thereby restricts the operation for designating a channel or the like from the user. Then, the television receiver 110 displays the shift to the user operation disabled state (step S19). By the television receiver 110 shifting to such a state, the operator OP is capable of resuming the operation of the television receiver. In this way, the action is performed in the operation system for the television receiver 110.

(Action of the Television Receiver)

Figure 6:
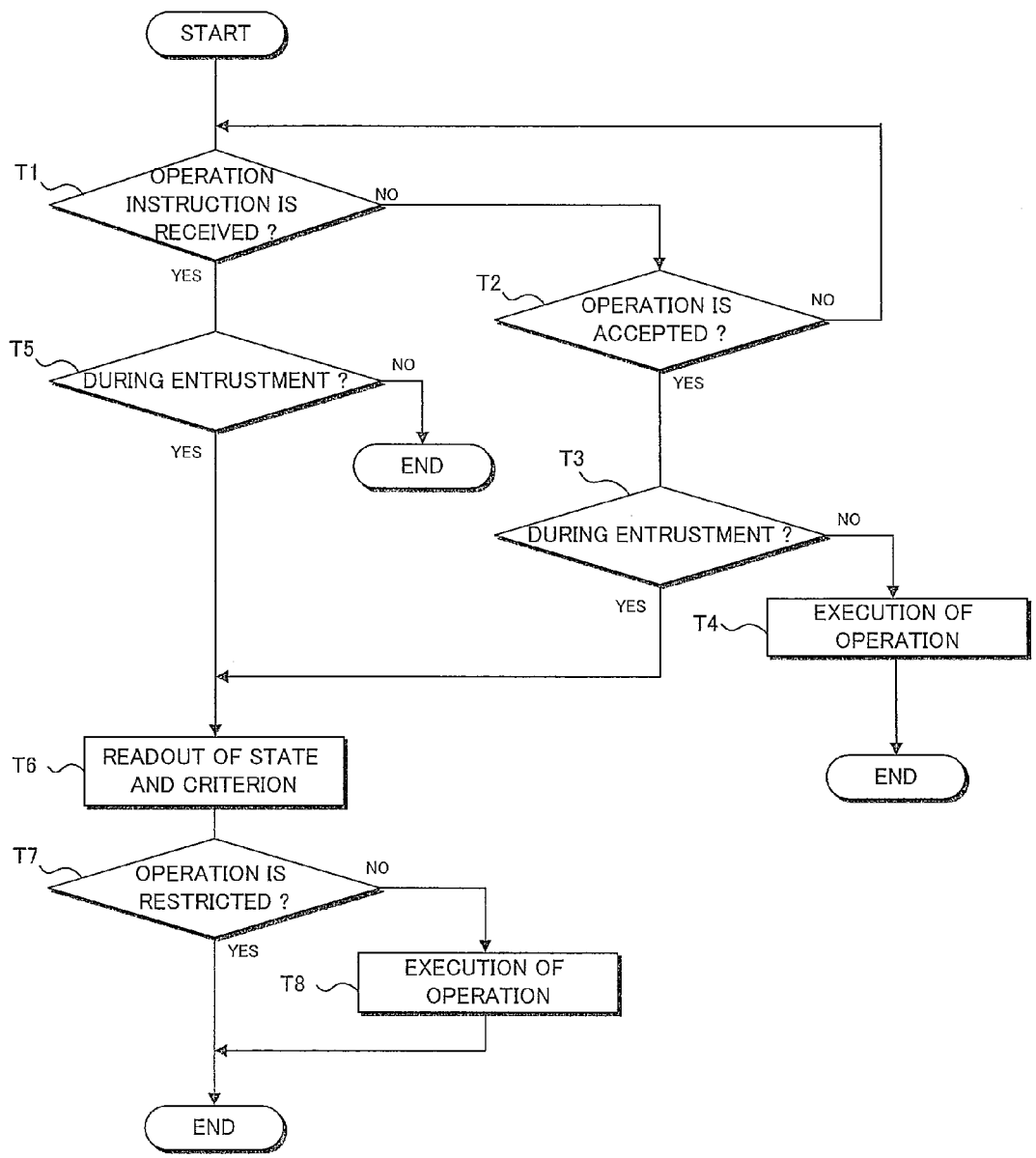
FIG. 6 is a flowchart illustrating action of the television receiver according to Embodiment 1.

Described next is the action when the television receiver 110 is remotely operated or directly operated. FIG. 6 is a flowchart illustrating the action of the television receiver 110. First, the television receiver 110 determines whether or not an operation instruction is received (step T1). When it is determined that an operation instruction is not received, the television receiver 110 further determines whether or not direct operation is accepted (step T2). When it is determined that the direct operation is not accepted, the processing flow returns to step T1. When it is determined that the direct operation is accepted, the television receiver 110 determines whether or not the state is that the operation is entrusted to the outside (step T3). Then, when it is determined that the operation is not entrusted to the outside, the operation is executed (step T4), and finished. When it is determined that the operation is entrusted to the outside, the processing flow proceeds to step T6. Meanwhile, when it is determined that the operation instruction is received in step T1, the television receiver 110 determines whether or not the state is that the operation is entrusted to the outside (step T5). Then, when it is determined that the operation is not entrusted to the outside, the processing is finished. When the operation is entrusted, the television receiver 110 reads the criterion and state in which the television receiver 110 is set (step T6).

Then, the television receiver 110 reading the criterion and its state determines whether or not to restrict the operation based on the state of the receiver 110 and criterion (step T7). When the television receiver 110 determines not to restrict the operation, the television receiver performs control associated with the operation (step T8: operation execution processing). Meanwhile, when the television receiver 110 determines to restrict the operation, the television receiver finishes the processing. In this way, the television receiver 110 determines whether or not to restrict the remote operation or direct operation, and performs the action associated with the determination.

Embodiment 2

Figure 7:
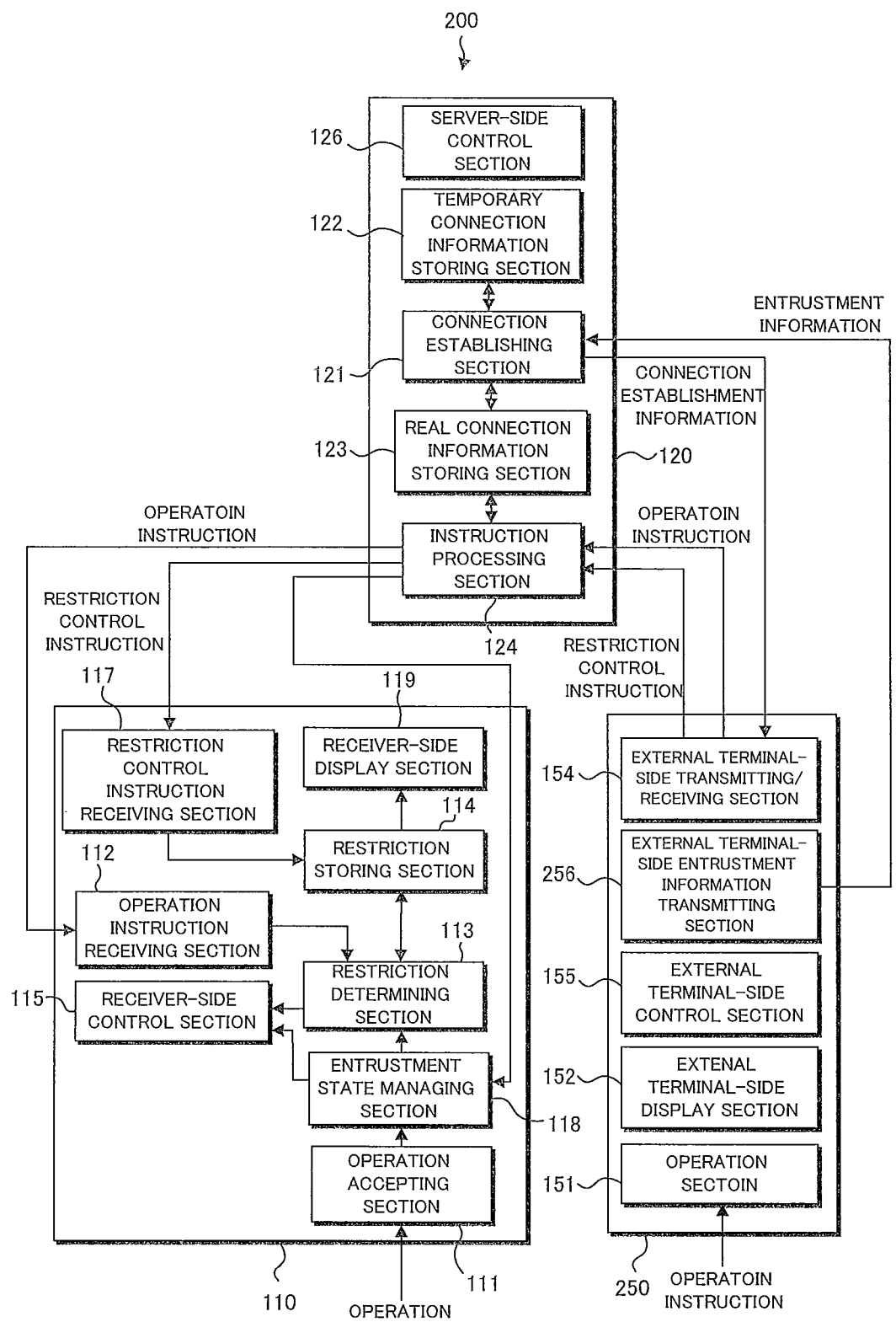
FIG. 7 is a block diagram illustrating a configuration of each section in an operation system for a television receiver according to Embodiment 2.

In the above-mentioned Embodiment, the television receiver 110 accepts the operation of entrustment, and transmits the entrustment information. In contrast thereto, an external terminal 250 may transmit the entrustment information to the television receiver 110 by operation of the operator OP to entrust the operation of the television receiver 110 to the outside. FIG. 7 is a block diagram illustrating a configuration of each section of an operation system 200 for a television receiver. The external terminal 250 is provided with an entrustment information transmitting section 256. The external terminal-side entrustment information transmitting section 256 transmits the entrustment information indicating that entrustment is made to the server 120 when the entrustment operation is input to the operation section 151.

Figure 8:
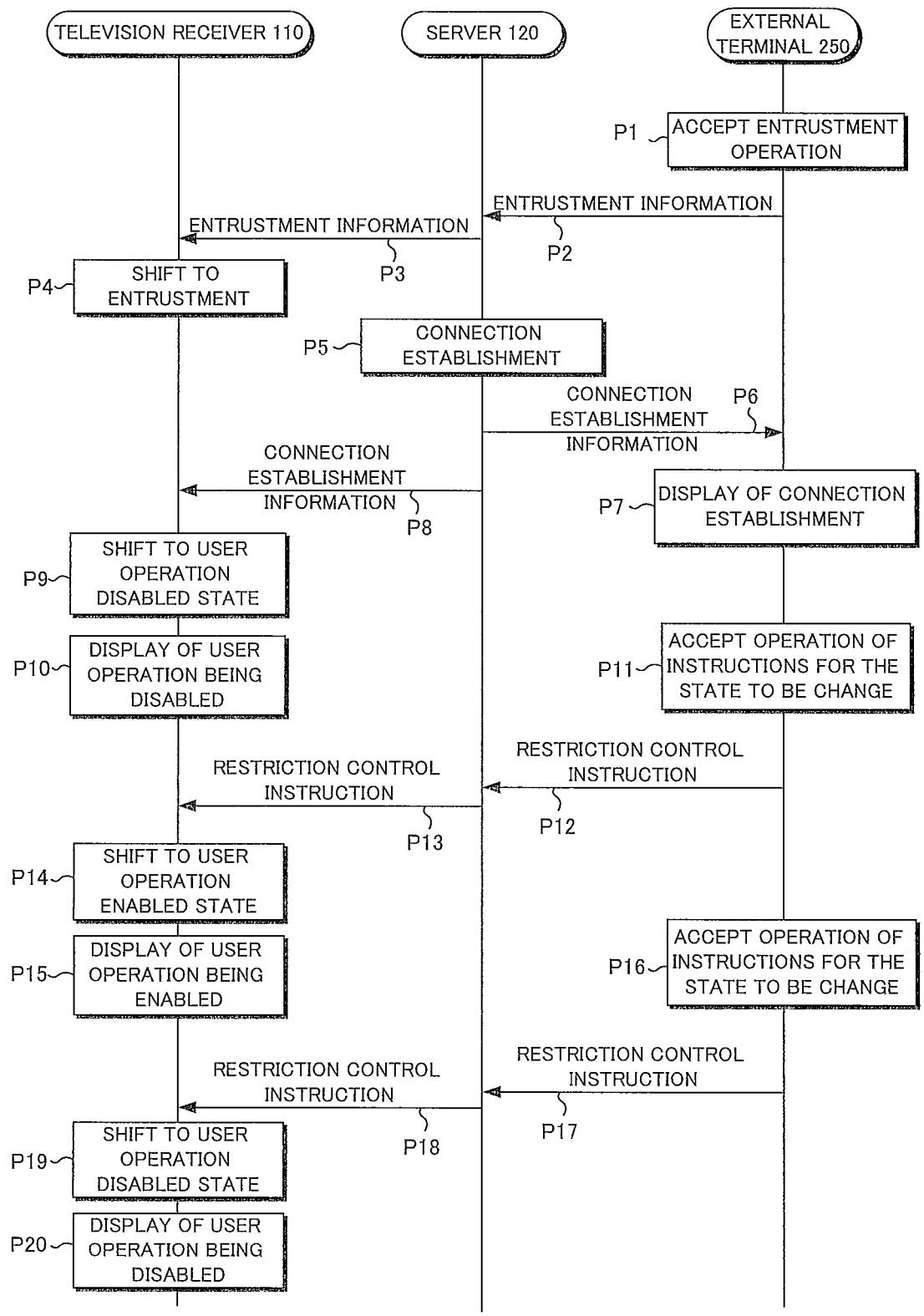
FIG. 8 is a sequence chart showing an example of action in the operation system for the television receiver according to Embodiment 2.

Described next is the action in the operation system 200 for the television receiver in Embodiment 2. FIG. 8 is a sequence chart showing an example of the action in the operation system 200 for the television receiver. When the user U expresses user's intention to entrust the operation to the operator OP using the transfer means T, the operator OP inputs the fact that the operator OP is entrusted to the operation section 151 of the external terminal 250 (step P1). The external terminal-side entrustment information transmitting section 256 transmits the entrustment information indicating that entrustment is made to the server 120 (step P2), and the server 120 transmits the entrustment information to the entrustment state managing section 118 of the television receiver 110 (step P3).

The television receiver 110 receiving the entrustment information changes the managed description to the state (during entrustment) that the operation is entrusted to the outside (step P4). Meanwhile, the server establishes the connection (step P5). The server 120 transmits the connection establishment information to the external terminal 250 (step P6), and the external terminal 250 displays that the connection is established (step P7). Subsequent action i.e. the action of P8 to P20 shown in FIG. 8 is the same action in S7 to S19 as shown in FIG. 5. In this way, the external terminal 250 may transmit the entrustment information to the television receiver 110 by operation of the operator OP to entrust the operation of the television receiver 110 to the outside.

In addition, in the above-mentioned Embodiments, the television receiver 110 has the entrustment state managing section 118, and the entrustment state managing section 118 manages the entrustment state, but the television receiver 110 may not have the entrustment state managing section 118. In this case, when the direct operation is performed, the restriction determining section 113 makes a determination on a restriction on the operation including the entrustment state.

The invention claimed is:

1. A television receiver capable of being operated via a network, comprising:
    an operation receiver that receives an operation given via the network;
    an operation acceptor that accepts an operation that is directly given without using the network;
    a restriction determiner that determines restrictions for the operation given via a network and the operation directly given without using the network, each operation restriction being determined based on the substance of the operation and the origin of the operation so as to avoid conflict between the operation given via the network and the operation directly given without using the network, wherein there is no simultaneous restriction of operations with different origins; and
    a receiver-side controller that executes control associated with the operation when the restriction determining section determines not to restrict the operation.

2. The television receiver according to claim 1, further comprising:
    an entrustment state manager that manages whether or not the operation is entrusted to an external terminal connected to the network,
    wherein the entrustment state manager causes the restriction determiner to determine whether or not to restrict the operation accepted in the operation acceptor when the operation is entrusted to the external terminal, while causing the restriction determiner not to restrict the operation accepted in the operation acceptor when the operation is not entrusted to the external terminal.

3. The television receiver according to claim 1, further comprising:
    a restriction control instruction receiver that receives a restriction control instruction for providing instructions for control on whether or not to restrict each operation,
    wherein according to the received restriction control instruction, the restriction control instruction receiver determines a criterion by which the restriction determiner determines whether or not to restrict each operation.

4. The television receiver according to claim 1, further comprising:
    a restriction storage that stores a restriction determination table for associating the operation based on the received operation instruction or the accepted operation with a restriction on the operation, wherein the restriction determiner determines whether or not to restrict each operation based on the stored restriction determination table.

5. The television receiver according to claim 1, further comprising:

a receiver-side display section that displays the substance of operation restriction based on the criterion by which the restriction determiner determines whether or not to restrict each operation.

6. A server for enabling operation of a television receiver from an external terminal via a network, comprising:

a connection establisher that establishes a connection between the external terminal and the television receiver by transmitting connection establishment information to the television receiver responsive to receiving entrustment information for entrusting operation to the external terminal transmitted from the television receiver; and an instruction processor that receives an operation transmitted from the external terminal to operate the television receiver, and transmit the operation to the television receiver having the connection established to the external terminal, wherein responsive to receiving the connection establishment information, the television receiver determines restrictions for the operation given via a network and the operation directly given without using the network each operation restriction being determined based on the substance of the operation and the origin of the operation so as to avoid conflict between the operation given via the network and the operation directly given without using the network, wherein there is no simultaneous restriction of operations with different origins.

7. An operation system for a television receiver comprised of an apparatus group of a television receiver, a server, and an external terminal connected via a network, wherein the server has an instruction processor which receives an operation transmitted from the external terminal to operate the television receiver, and transmits the operation instruction to the television receiver having a connection established to the external terminal, and the television receiver comprises:

an operation instruction receiver that receives an operation given via the network, an operation acceptor that accepts an operation that is directly given without utilizing the network, a restriction determiner that determines restrictions for the operation given via a network and the operation directly given without using the network, each operation restriction being determined based on the substance of the operation and the origin of the operation so as to avoid conflict between the operation given via the network and the operation directly given without using the network, wherein there is no simultaneous restriction of operations with different origins, and a receiver-side controller that executes control associated with the operation when the restriction determiner determines not to restrict the operation.

8. A non-transitory computer readable medium storing an operation program of a television receiver capable of being operated via a network which when executed by a processor causes the television receiver to perform a method comprising:

receiving an operation given via the network;

accepting an operation that is directly given without using the network;

determining restrictions for the operation given via a network and the operation directly given without using the network, each operation restriction being determined based on the substance of the operation and the origin of the operation so as to avoid conflict between the operation given via the network and the operation directly given without using the network, wherein there is no simultaneous restriction of operations with different origins; and executing control associated with the operation when it is determined not to restrict the operation.

\* \* \* \* \*